United States Patent

Bias, Sr.

[11] Patent Number: 5,857,818
[45] Date of Patent: Jan. 12, 1999

[54] LUG NUT COVER

[76] Inventor: Donald R. Bias, Sr., 36763 Jackson Township Rd. 10, Macksburg, Ohio 45746

[21] Appl. No.: 811,391
[22] Filed: Mar. 4, 1997
[51] Int. Cl.[6] .............................. F16B 37/14; A47G 3/00
[52] U.S. Cl. ............................ 411/431; 411/429; 411/373
[58] Field of Search ...................... 411/429, 431, 411/373, 410, 396, 371

[56] References Cited

U.S. PATENT DOCUMENTS

| | | | |
|---|---|---|---|
| 787,578 | 4/1905 | Lambert | 411/429 |
| 3,897,712 | 8/1975 | Black | 411/373 |
| 4,659,273 | 4/1987 | Dudley | 411/429 |
| 5,364,213 | 11/1994 | Teramura | 411/431 |
| 5,624,218 | 4/1997 | Dauwalter | 411/373 |

FOREIGN PATENT DOCUMENTS 181157   6/1922   United Kingdom ................... 411/429

*Primary Examiner*—Flemming Seather
*Attorney, Agent, or Firm*—John L. Gray; Kegler, Brown, Hill & Ritter

[57] ABSTRACT

A removable cover for lug nuts, used for mounting a wheel rim on a vehicle, characterized by having a plurality of flat side surfaces which engage the complimentary sides of a lug nut where adjacent side surfaces are separated by a slot so that the side surfaces will function as a spring to retain the cover on the lug nut.

2 Claims, 2 Drawing Sheets

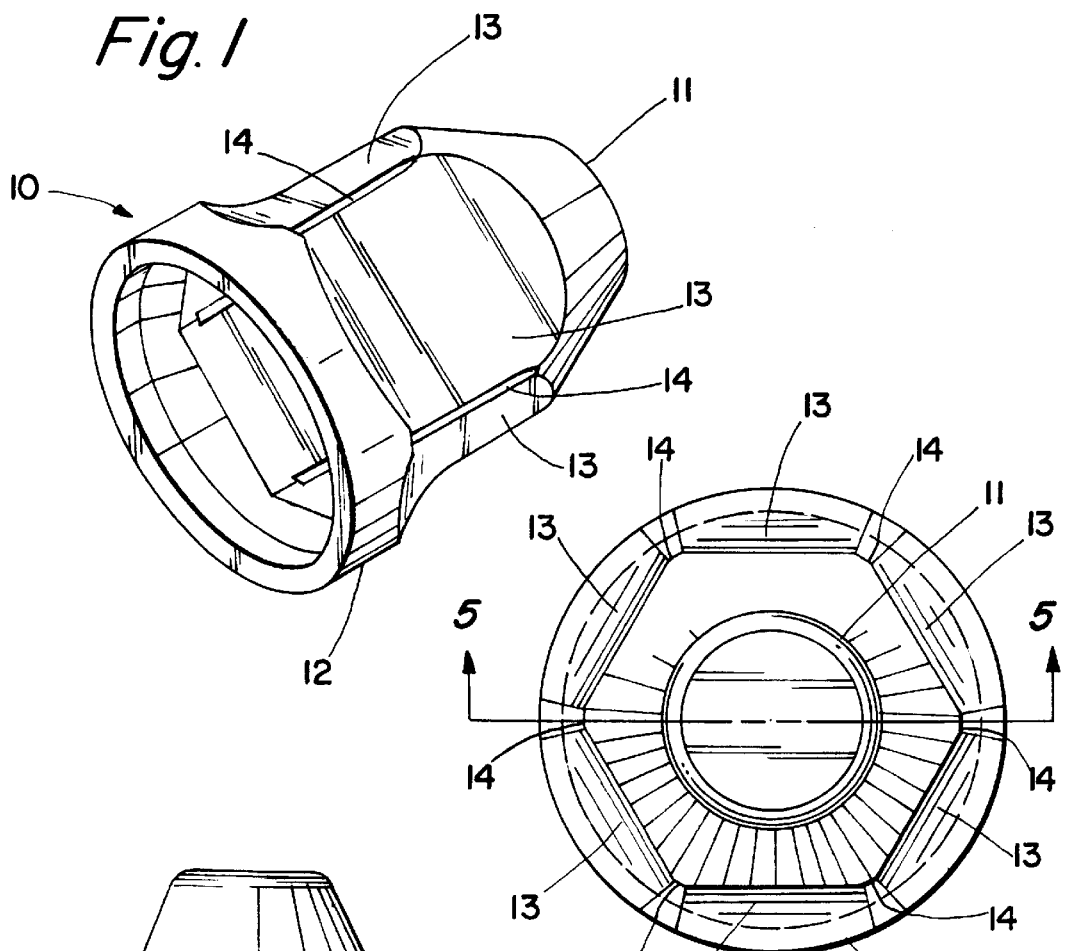
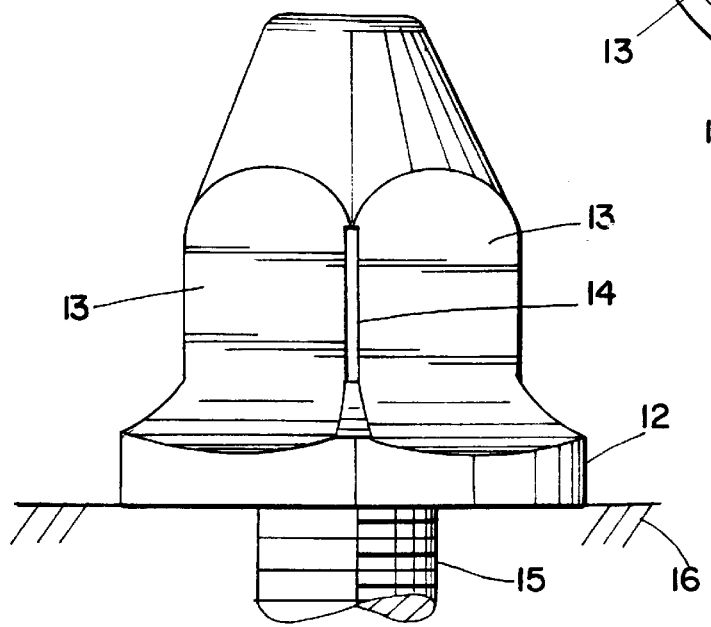

LUG NUT COVER

BACKGROUND OF THE INVENTION

This invention relates to a protective decorative cap for covering tile lug nut and bolt or stud for attaching a wheel rim to a car, truck, bus, or the like. A variety of such protective, decorative caps have been developed. A common problem encountered is to ensure that the cover will remain on the lug nut on the vehicle during use. For example, in Applicant's U.S. Pat. No. 5,082,409, the cover is retained by means of a plurality of clips within the shell cavity.

U.S. Pat. No. 4,824,305, McCauly, relies on a plastic insert within the decorative shell for permanently mounting the insert within the shell and an annular-longitudinal portion of the insert as internal threads for mating engagement with the thread of the stud.

U.S. Pat. No. 4,890,967, Rosenbaum, utilizes a resilient, compressible retainer having legs which align with the flats of a bolt head or nut over which a generally cylindrical cap is applied.

U.S. Pat. No. 4,582,462, Thiel utilizes at least two axial profile webs on the internal face of the casing arranged to engage and hold the cap on the nut.

U.S. Pat. No. 4,576,533, Chartier utilizes an annular channel formed in the inner wall of the cap for receiving a snap fit engagement with a lower circumferential flange of a particular type of fastener head.

U.S. Pat. No. 5,163,739, Standlake, uses a wheel cover having a plurality of tubular extensions for attaching the wheel cover to the lug nuts of the wheel.

French Patent No. 2386-722 utilizes two diametrically opposite tongues to retain the cap on the bolt.

BRIEF SUMMARY OF THE INVENTION

Applicant's invention involves a removable cover for bolts and lug nuts wherein adjacent planar inside surfaces, which engage the complimentary surfaces of the lug nut, are each separated from adjacent side surfaces by slots. The cover is sized so that it is slightly smaller in horizontal dimensions than the lug nut which it covers so that the lug nut is forced up against the side surfaces as the cover is pushed down over the lug nut and the side surfaces, because they are provided with the slots they are allowed to flex yielding slightly but clamping and holding the lug nut cover in place against the normal types of vibration encountered in usage.

Unlike the prior art lug nut covers which are permanently held in place, Applicant's invention may be readily removed so that the lug nuts may be removed for purposes of changing a tire, etc. and then replaced after the lug nuts are secured to the wheel.

It is therefore an object of this invention to provide a vehicle lug nut cover which will be firmly secured by gripping action to the lug nut of the vehicle but which may be readily removed therefrom.

It is a further object of this invention to provide such a lug nut cover which will be easy to manufacture and involve no additional separate parts and consequently will be available at a lower cost.

These together with other objects of the invention will become apparent from the following detailed description of the invention and the accompanying drawings.

BRIEF DESCRIPTION OF THE DRAWINGS

FIG. 1 is a perspective view of Applicant's invention.

FIG. 2 is a top plan view of Applicant's invention.

FIG. 3 is a side elevation view of Applicant's invention pressed on the top of a lug nut.

DETAILED DESCRIPTION OF THE INVENTION

Referring now to FIG. 1, the removable nut cover is shown generally at 10 with the dome-shaped upper end 11 and the planar base 12 which is adapted to abut against the wheel rim. This product may be made from injected molded plastic which is platable and then chrome-plated. The cover may also be made of other materials such as brass, copper, stainless steel, and aluminum, all of which may be chrome-plated. The dome and the base are connected by a plurality of flat side surfaces 13—13 with adjacent side, surfaces being separated by slots 14—14.

Referring now to FIG. 2, which is a top plan view of the nut cover as shown in FIG. 1, it is seen that this particular nut cover which is designed for a hexagonal sided lug nut has a dome-shaped end 11 and six flat side surfaces 13—13, each adjacent side surface being separated by slots 14—14 all set on base 12.

Referring now to FIG. 3, the removable nut cover is shown covering a lug nut 15 and resting on a vehicle wheel 16.

Figure 4:
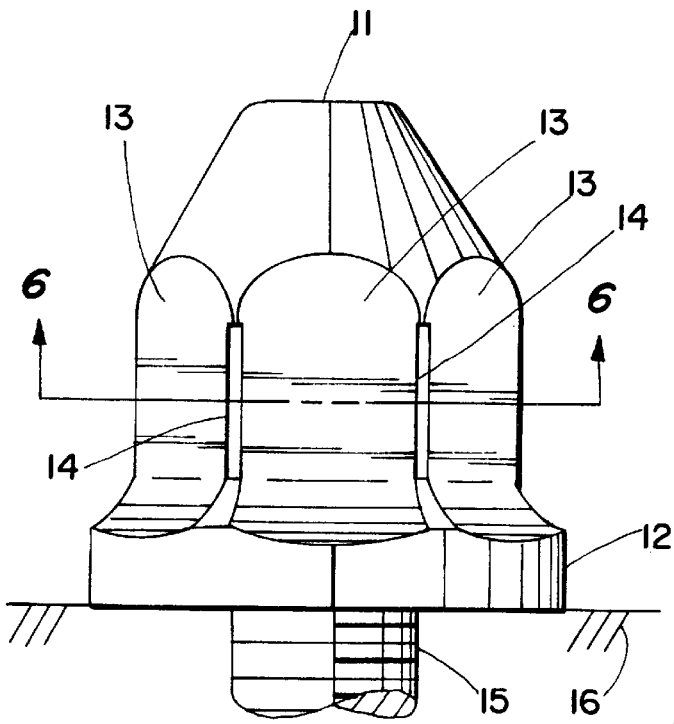
FIG. 4 is a view similar to FIG. 3 showing Applicant's invention located on a lug nut.

FIG. 4 is similar to FIG. 3 except that it is a view which shows three of the sides of the hexagonal shape rather than just the two.

Figure 5:
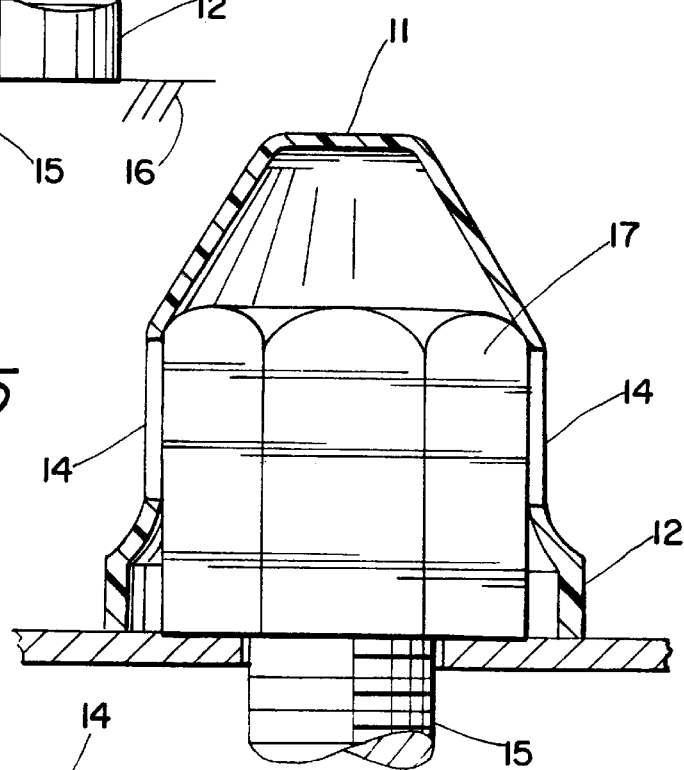
FIG. 5 is a side elevation section view of FIG. 2 on section lines 5—5.

FIG. 5 is a section through FIG. 2 showing the lug nut he,ad 17 which is attached to the bolt portion of the lug nut 15 connected to a vehicle wheel 16.

Figure 6:
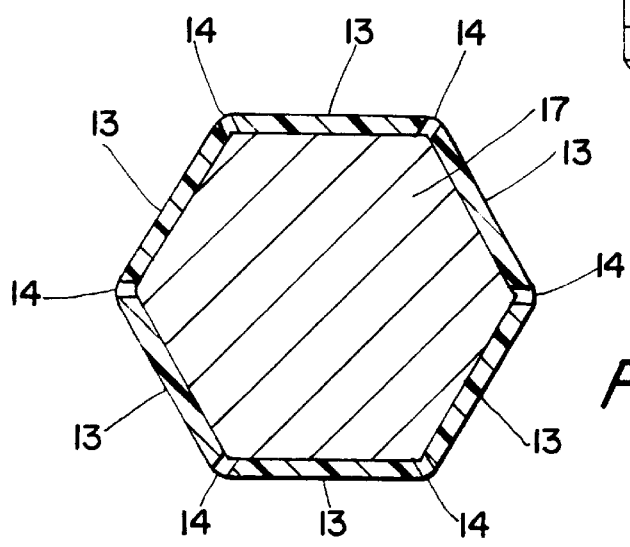
FIG. 6 is a side elevation section view of FIG. 4 on section lines 6—6.

FIG. 6 shows a section of FIG. 4 showing the lug nut pressed firmly against each of the flat side surfaces 13—13 so as to create the gripping feature of -he invention and retaining the removable cover on the lug nut.

In operation, the cover 10 is merely pressed down over the lug nut 17 and because of the slots 14—14 and the resultant gripping action of the flat side surfaces 13-13 it will be retained in place until it is pulled off manually.

While this invention has been shown and described with respect to a detailed embodiment thereof, it will be understood by those skilled in the art that various changes in form and detail thereof may be made without departing from the scope of the claims of the invention.

What is claimed is:

1. A combination lug nut or bolt for mounting a wheel rim on a vehicle and a removable cover for said lug nut or bolt comprising:

a lug nut or bolt having flat sides;

a removable cover of a size and shape so as to fit over the head of said bolt or lug nut;

said cover having a dome-shaped end;

a plurality of adjoining flat side surfaces extending downwardly from said dome-shaped end of said cover for defining a cavity, each side surface having an outer wall and a generally planar inner wall;

said cover also having a generally planar base opposite said dome-shaped end, said base adapted for abutting said wheel rim when secured over a bolt or lug nut attaching said wheel rim to said vehicle.

2. The combination lug nut or bolt for mounting a wheel rim on a vehicle and removable cover for said lug nut or bolt of claim 1 wherein said means for retaining said cover on said bolt or lug nut comprises:

said side surfaces of said cover having horizontal dimensions between opposite side surfaces slightly smaller than the corresponding horizontal dimensions between opposite sides surfaces of said bolt or lug nut and being of a size and shape so as to engage the corresponding flat side surfaces of said bolt or lug nut, each side surface of said cover being separated from its adjoining side surface by an open slot extended a fixed distance down between said side surfaces from said dome shaped end to said generally planar base, whereby said slots are located at the edges where the adjoining flat side surfaces of said bolt or lug nut join.

* * * * *